W. MORRISON.

CENTRIFUGALLY REGULATED POWER TRANSMISSION SYSTEM.

APPLICATION FILED SEPT. 9, 1916.

Reissued Mar. 13, 1917.

14,270.

3 SHEETS—SHEET 1.

Inventor

William Morrison

By Byrnes Townsend & Brickenstein

Attorneys

W. MORRISON.
CENTRIFUGALLY REGULATED POWER TRANSMISSION SYSTEM.
APPLICATION FILED SEPT. 9, 1916.
Reissued Mar. 13, 1917.
14,270.
3 SHEETS—SHEET 2.
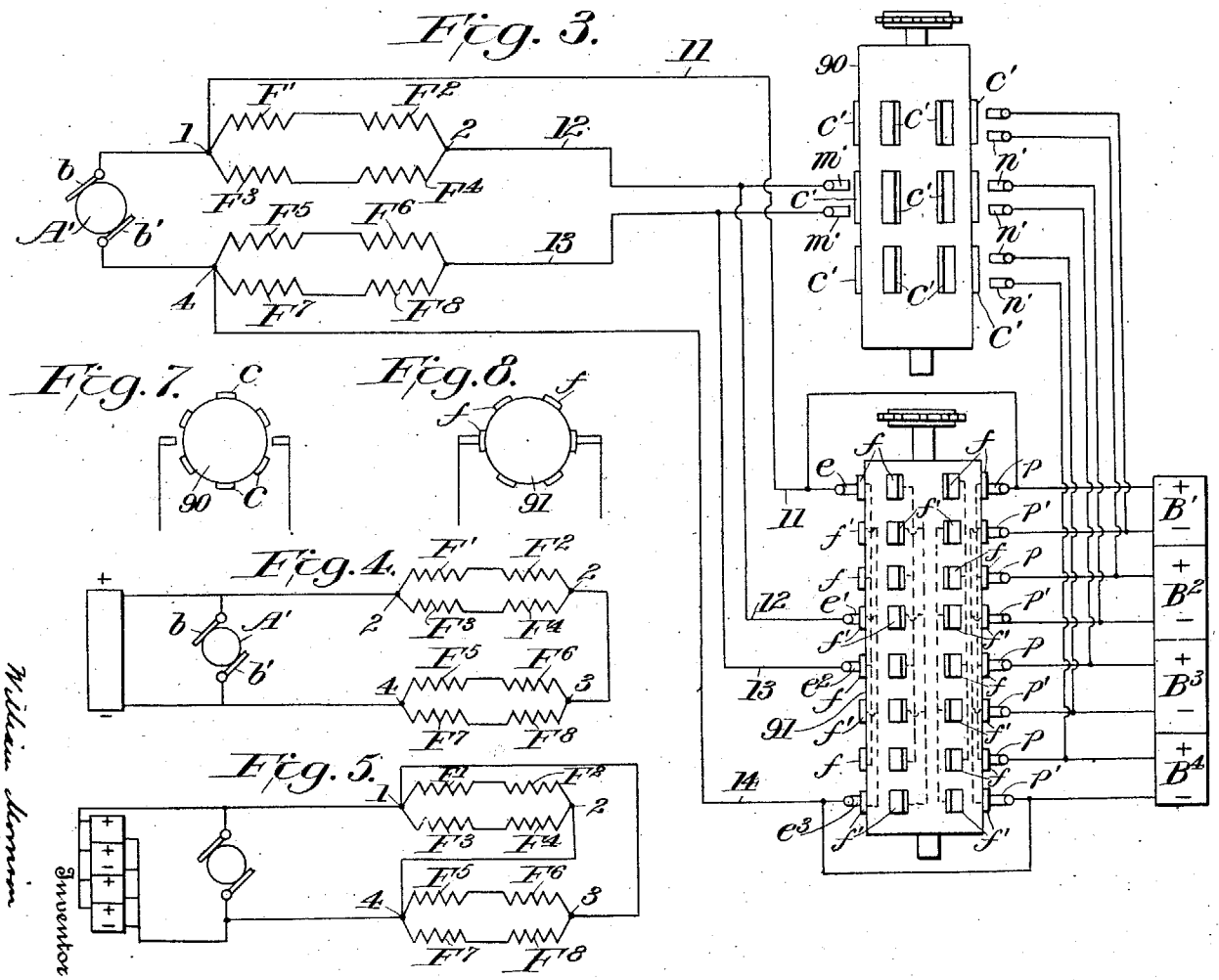
Inventor
William Morrison
By Byrnes Townsend & Brickenstein
Attorney

W. MORRISON.

CENTRIFUGALLY REGULATED POWER TRANSMISSION SYSTEM.

APPLICATION FILED SEPT. 9, 1916.

Reissued Mar. 13, 1917.

14,270.

3 SHEETS—SHEET 3.

Inventor

William Morrison

By Byrnes Townsend & Brickenstein

Attorneys

UNITED STATES PATENT OFFICE.

WILLIAM MORRISON, OF CHICAGO, ILLINOIS, ASSIGNOR TO VESTA ACCUMULATOR COMPANY, OF CHICAGO, ILLINOIS, A CORPORATION OF ILLINOIS.

CENTRIFUGALLY-REGULATED POWER-TRANSMISSION SYSTEM.

14,270. Specification of Reissued Letters Patent. Reissued Mar. 13, 1917.

Original No. 1,126,060, dated January 26, 1915, Serial No. 790,538, filed September 18, 1913. Application for reissue filed September 9, 1916. Serial No. 119,302.

*To all whom it may concern:*

Be it known that I, WILLIAM MORRISON, a citizen of the United States, residing at Chicago, in the county of Cook and State of Illinois, have invented certain new and useful Improvements in Centrifugally-Regulated Power-Transmission Systems, of which the following is a specification.

My invention relates to a power-transmission system, capable of general application, but principally designed and applied to automobiles driven by variable speed gas-engines, in which system the power is transmitted from the gas-engine to the driven shaft through a dynamo-electric machine acting as a clutch, in such manner that but a small fraction of the power developed by the gas-engine is utilized in the clutch, the balance of the power being transmitted directly through the driven shaft.

My invention further provides a system in which the speed regulation of the automobile is effected, as in any ordinary gas-engine-driven automobile, by varying the speed of the engine, the dynamo acting in the main simply as an electromagnetic clutch, and generating only enough current, under normal running conditions, to produce the requisite clutching effect.

The requisite clutching effect is that which will couple the engine shaft to the driven shaft by a magnetic pull sufficient to enable the operation of the automobile under all normal speed conditions and under ordinary road conditions, but is not so great as to prevent a small speed variation between the driving and driven shafts under abnormal conditions. Thus the clutch has under normal running conditions all the effectiveness of a mechanical clutch, but is none the less capable of yielding to a limited degree when there are sudden increases in the load, such as occur momentarily during the starting and changing speeds or when the automobile strikes an obstacle or is otherwise suddenly retarded. The elements of my new dynamo-electric clutch are therefore designed to produce this requisite clutching effect, the current necessary to magnetize the rotary field magnet and rotary armature to the extent required being generated at the outset in the armature at a comparatively very small number of slip revolutions, the energy thus consumed in the clutch being, therefore, but a very small fraction of that developed by the gas-engine, all the remaining energy developed by the engine at speeds above that required for generating the clutching current being available for load-driving purposes.

My invention further relates to the combination with a dynamo-electric clutch of this kind, of a storage battery whose current is utilized for operating the dynamo as a motor to start the gas-engine, for operating incandescent lamps, sparking-coils, etc. For reasons which will later appear, it is highly desirable that during the operation of the dynamo as a clutching generator, this battery, which for starting purposes should be capable of furnishing a relatively high voltage, should have its cells or sets of cells arranged as far as possible in parallel to receive and deliver current at the lowest possible voltage. This voltage must correspond to the voltage of the incandescent lamps used for lighting, and may be, for example, from 2 to 8 volts.

The armature of the dynamo is therefore wound with a large number of turns and in such manner that, with a small number of slip revolutions, it will generate current at a voltage substantially equal to that of the fully charged batteries when connected in the predetermined multiple relation.

The field coils are so wound that at the voltage described there will be provided a sufficient number of ampere-turns to provide a powerful magnetic field, the size of wire on both armature and field being properly proportioned to safely carry the current. In practice it has been found best to use a multipolar dynamo-electric machine, both eight-pole and twelve-pole machines having been constructed and found to be efficient.

The invention of this application particularly relates to an improvement on or addition to the power-transmission system of my prior application Serial No. 784,458, filed August 12, 1913, now Patent No. 1,126,059, patented January 26, 1915, and has for its object to utilize the centrifugal force produced by the rapid rotation of the rotors to assist to the desired extent the electromagnetic clutching action, either by so arranging the brushes and their coöperating moving parts, that the centrifugal force causes them to press against the commutator, or by providing the rotors with interacting centrifugally-operated sliding clutch devices, independent of the current collecting mechanism.

The construction and operation of a system embodying the invention will be apparent from the accompanying specification and drawings, in which,—

Figs. 3, 4 and 5 are circuit diagrams, for clearness, only connections for a four-pole machine being shown;

Figs. 7 and 8 show the relative positions of the controller drums;

Figure 1:
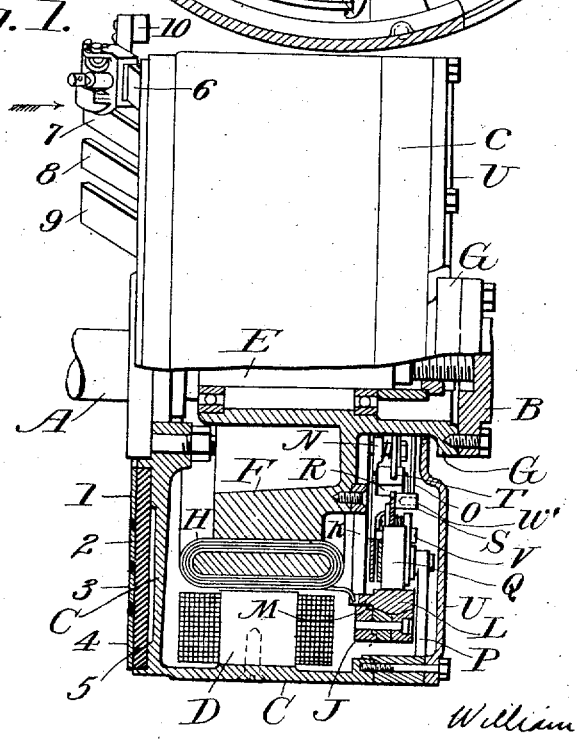
Figure 1 is a side view, partly in elevation and partly in section.
Figure 6:
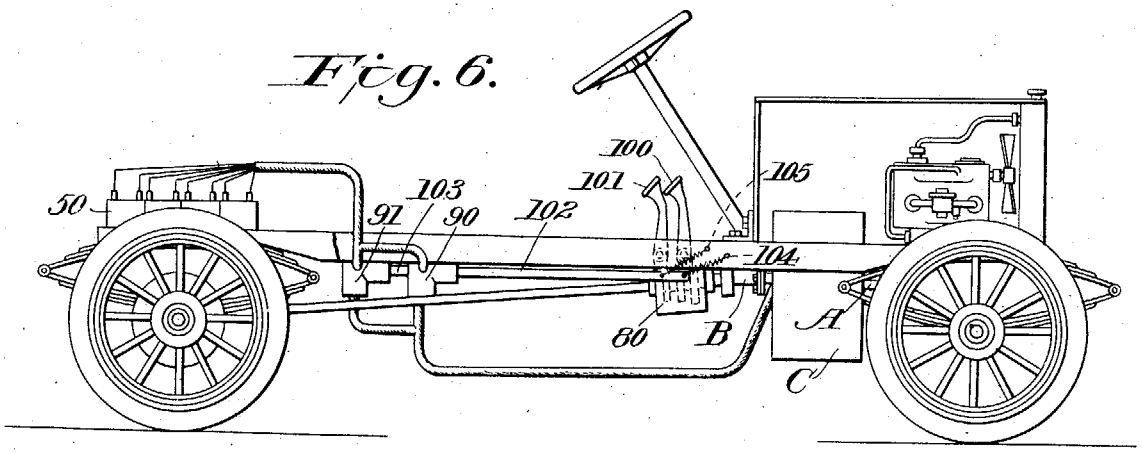
Fig. 6 is a schematic representation of my invention as applied to an automobile.

Referring to Fig. 1, A is the engine shaft and B the driven shaft, connected as shown in Fig. 6, through the usual speed-changing gears 80, to the driving gear of the automobile. Secured to the shaft A is the open-ended drum C, which may be of cast steel, having secured to its inner face the field magnet poles D, eight in number being indicated, although any other suitable number may be used. Secured to or forming part of the shaft A is a stub-shaft E, on which is mounted, in ball-bearings, the armature F. To the flange G on the armature hub is secured, by any suitable means, the end of the automobile driving shaft B. For convenience of illustration, the armature has been shown with Gramme-ring windings H, though I may use a drum armature with the coils wound in slots of a laminated ring.

The commutator ring J is carried on a series of arms K bolted to the body of the armature. The commutator bars L are clamped into the ring and insulated therefrom in any desired manner. Each bar L has an inwardly projecting lug M to which the wires from the armature coils are connected.

This commutator, it will be noted, has its brush-bearing surface on the inside, instead of the outside. This is advantageous, since the brushes carried on the rotating field-drum are forced outwardly by the centrifugal force and thereby held in firm contact with the commutator bars.

The brushes are carried on two rings N and O, bolted to the inner ends of the arms P secured to the drum C. These rings are insulated from the arms P and from each other, and each carries, in the particular machine shown, a series of four brushes Q, R.

Figure 2:
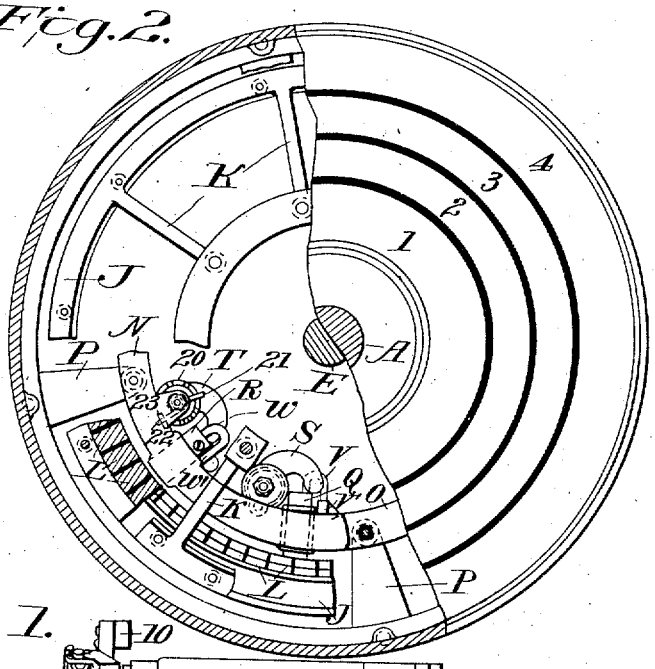
Fig. 2 is a view looking from left to right in Fig. 1, portions being broken away to show details of construction.

As shown in Fig. 2, the brushes Q, R are pressed outwardly, by spring-pressed lever arms S, T, against the inner face of the commutator J. The arms S, T are pivotally mounted on the brush-carrying rings O, N, and each of these arms has secured to or formed as a part of it, a notched ring 20. Around the pivot of each arm is wound a wire spring with one end 21, seated in one of the notches in the ring 20, and the other end 22 held in a clip or lug 23 secured to the carrying ring. It will be evident that by locating the end 21 of the spring in one or the other of the notches that the pressure of the springs on arms S, T on the brushes can be increased or diminished.

The centrifugal force due to rotation tends to throw the arms S, T and the brushes Q, R outward and the brushes are therefore forced more strongly than by the force of the springs alone, against the inside of the commutator, the increased friction tending to keep the two rotors in closer clutching relation, or, in other words, to diminish the slip. The brushes, which may be of carbon, slide readily over the commutator, but as there are a number of these brushes, for example eight when the dynamo is an eight-pole machine, the pressure and resulting friction due to the power of the springs and the centrifugal force, is, in the aggregate, sufficient to assist in keeping the rotors running together more closely than if this pressure were absent. By properly adjusting the weights of the brushes and lever arms and properly adjusting the compression of the springs, the relative difference of speed or "slip" between the rotors may be additionally controlled in the manner hereinafter described.

Wires V and W conduct current from the brushes to the terminals V′ and W′ mounted on their respective rings, each ring, in this particular case, carrying four brushes. These brush-carrying rings are connected to the proper collecting rings (to be referred to later) on the back of the drum C.

The right-hand end of the drum is closed by a removable cover U, preferably made in two parts so as to be readily disengaged. Mounted on the back or closed end of the drum is a series of collector rings 1, 2, 3, 4, insulated from the drum by a layer 5 of insulating material. A series of brushes 6, 7, 8, 9 (only one being fully illustrated) is supported on a fixed part 10 of the frame of the automobile.

From the brushes 6, 7, 8, 9, wires 11, 12, 13, 14 lead to two separately operated controllers 90, 91, the connections being diagrammatically shown in Fig. 3. The back end of the drum is covered by a casing (not shown).

90 is the engine-starting controller and 91 that used in the running position or that in which the dynamo is used as a clutch.

As shown, the field coils F′ to $F^8$ are connected in a series-multiple arrangement, those connections which remain fixed being made within the drum C, and the ends of the groups being connected to the rings 1, 2, 3 and 4. Obviously, groupings of the field coils other than those shown might be made.

The batteries are shown as comprising four units $B^1$, $B^2$, $B^3$, $B^4$, each of which may consist either of a single cell or a group of cells in series. Obviously, this particular number of units may be varied as varying conditions may demand.

The controller 91 consists of a drum of insulating material on the surface of which are arranged a number of longitudinal sets of separated contact blocks $f$, $f'$. As shown in Fig. 8, six sets may be used. Located to engage these contact blocks are a series of brushes $p$, $p'$, connected, as shown, to the positive and negative ends of the battery units, and a second set of brushes $e$, $e^1$, $e^2$, $e^3$ are connected to the conductors 11, 12, 13, 14. The blocks $f$ of each set are electrically connected, as shown in dotted lines, and the blocks $f'$ are similarly connected. As shown in Fig. 3, the circuits are closed to establish the relations shown in Fig. 5.

The connections may be traced (Fig. 3) as follows:—

From armature brush $b$ to junction 1, coils $F^1$, $F^2$, $F^3$, $F^4$ to junction 2, wire 12, brush $e^1$ and its block $f$ through the controller connection to a lower block $f^1$, brush $e^3$, wire 14, junction 4, the armature brush $b^1$. At the same time, a circuit has been closed from junction 1, wire 11, brush $e$ and a block $f$, through controller-connections to a lower block $f$, brush $e^2$, wire 13, junction 3, coils $F^6$, $F^5$ and $F^8$, $F^7$, to junction 4. The battery units are also connected in multiple, and in shunt to the armature, their positive ends being connected together, through brushes $p$, blocks $f$ and controller connections, wire 11, junction 1 and brush $b$, while their negative ends are similarly, through brushes $p^1$, blocks $f^1$ and controller connections, connected together and to wire 14, junction 4 and brush $b^1$. The arrangement of circuits thus produced is diagrammatically shown in Fig. 5. The particular arrangement of circuit-controllers described is not essential to my invention, as any other form by which the circuits may be connected in the manner described, may be used.

The controller 90 consists of a drum of insulating material on the surface of which is arranged a number of longitudinal sets of separated contact blocks $c^1$. As shown in Fig. 7, six sets may be used. Located to engage these contact blocks is a series of brushes $n^1$, connected to the positive and negative ends of the battery units; and another set of brushes $m^1$ is connected to the conductors 12 and 13. The blocks $c^1$, $c^1$ are each wide enough to engage the brushes $m^1$, $m^1$, or $n^1$, $n^1$. As shown in Figs. 3 and 7, the engine-starting circuits are all open, none of the brushes being in engagement with the contact blocks. If, however, the drum is rotated one step, the brushes will rest on contact blocks and circuits will be closed to connect the batteries in series relation and the field coils in series relation. The arrangement of circuits thus produced is diagrammatically shown in Fig. 4, with the field coils connected in a series relation, and all the battery units in series. So connected, the battery is delivering current to the armature of the dynamo to operate it as an engine-starting motor, while in the arangement shown in Figs. 3 and 5, the paralleled batteries are connected to the armature to oppose the flow of current therefrom.

It will be noted that the batteries and field coils are arranged in shunt to the armature, so that whether the dynamo-electric machine is acting as a generator or a motor, the direction of rotation of the rotating field is the same.

The controller drums may be operated by an escapement controller mechanism, which is described in my application, Serial No. 742,277, filed January 15, 1913, now Patent No. 1,130,320, patented March 2, 1915. It will be sufficient for the purposes of this application to state that by downward pressure of the foot the controller-drum is rotated one step to close its circuits, and upon release of the pressure is given an additional step to open its circuits. The controllers may, of course, be operated by hand, or by any suitable mechanism.

As shown in Fig. 6, the controllers 90, 91 are operated by the foot-pedals 100, 101, pivoted on the frame of the machine and having connecting rods 102, 103. Retracting springs 104 and 105 are attached to the pedals in any suitable manner. Figs. 7 and 8 show the respective positions of the controller drums, one with circuits open when the circuits of the other are closed.

The operation of the system is as follows:—

The engine is started by causing the controller 90 to connect the field circuits across the middle block $c'$, and, at the same time, the battery is coupled in series by the wires leading to the brushes $n'$, $n'$, as above described. The maximum voltage of the battery is therefore delivering current to the system, coupled as shown in Fig. 4, the dynamo-electric machine acting as a shunt-wound motor. As the automobile is at rest, preferably with the brakes applied, the armature connected to its driving shaft is held against rotation and the field-magnet rapidly rotates. The engine shaft is thereby also rotated and the engine started.

The controller 90 is then rotated another step to break the connections above described. With the engine running, the brakes are released and the controller 91 is operated to bring the system into the condition shown in Fig. 5. As the field drum is now rotated by the engine, the dynamo-electric machine begins to act as a generator. As soon as the slip between the rotors is large enough, the requisite clutching current is generated. The engine may now be speeded up, and the armature is dragged around with the field, the dynamo acting as a clutch. All the power developed by this increased speed is then transmitted through the clutch to the driven shaft for driving the automobile, and the automobile is started without shock or jar. It will be noted that the current generated is used for clutching, and none of the electrical energy developed, is otherwise used in driving the automobile. The automobile is then operated in the usual way, the speed being controlled by throttling the engine, advancing or retarding the spark, or changing the gears, as may be desired. As will appear from Fig. 6, the dynamo element attached to the engine-shaft acts as the flywheel of the engine. 200 is the engine, which may be either a steam- or gas-engine, and 201 is a throttle for controlling the supply of motive fluid to the engine.

Under normal running conditions, the voltage at the brushes of the dynamo-clutch is equal to that of the fully-charged battery, so that no current is delivered to the battery, all the current generated in the armature flowing over the field circuit. If, however, for any reason, such as consumption of current in starting the engine, lighting, etc., the voltage of the battery is below the maximum, then part of the current generated by the slip will flow into and charge the battery, until the cells are again fully charged. For example, assuming that six-volt lamps are used, the battery is arranged with sets of three cells in series, the sets being in multiple. When fully charged, the voltage at the terminals of each set is approximately 7½ volts, and as the dynamo is arranged to normally deliver current at this voltage, no current can flow into the battery, except upon the slight rise of voltage such as that due to a sudden pull. If, however, the cells are not fully charged, the voltage of the set might be, say, six volts, and current would flow into the batteries, this charging current being delivered, however, into all the paralleled sets of cells, so that the charging is effected at a relatively slow rate, which is highly desirable, as if charged too rapidly the life of the cells would be lessened. The use of a plurality of cells or sets of cells is, therefore, of advantage in two respects, viz., that sufficient voltage is provided, when the battery is arranged in series relation, to furnish a powerful engine-starting current, and that, when connected in multiple relation, they are charged under the best conditions.

In order that as little as possible of the power of the gas-engine may be wasted in the generation of current for clutching purposes, the dynamo-electric clutch should be designed in such a manner that the requisite clutching-effect is secured by a small number of slip-revolutions or relative rotations of the field and armature rotors. It is evident that it is the number of the revolutions of the engine above that required to produce the clutching-effect, which can be utilized as the driving power for the automobile or other machine.

This construction gives all the advantages of electric driven machines with all the flexibility of such machines while converting but a few revolutions of the prime mover into current to be used in clutching, the remainder of the revolutions of the prime mover being used in running the automobile on the roadway without being converted into electric current, thus avoiding the loss of such conversion. In short, my invention avoids the waste inevitable in any system in which the total effort of the gas-engine, or any large proportion of such total effort, is converted into electric energy.

A dynamo-electric clutch of this kind is therefore capable of application to automobiles as now built, where there is no room for extra motor and generating sets, since a generator sufficient to produce the clutching effect is small in size. Moreover, a smaller gas-engine can be used to drive the car than would be necessary if the whole power developed by the gas-engine were converted into electrical energy to be used for running the car, since by my invention only enough electrical energy is generated and used to produce the clutching-effect, the balance of the power of the gas-engine being transmitted, preferably through gears, to the driving shaft of the automobile.

In order properly to design the clutch for a given machine, as for example an automobile, it is necessary first to measure, experimentally, the electrical energy required for clutching expressed in watts. The voltage at which this required power is to be generated is then determined, the essential consideration being that it should be as low as practicable, consistent with the character of the lighting-system. The dynamo is then designed in accordance with the well-known principles to develop the required power at the determined voltage, with due regard to the provision of a practically saturated field.

The armature of such a machine is wound with as many turns as practicable of wire of the proper current-carrying size, so that the necessary E. M. F. may be generated with the fewest practicable number of slip-revolutions; the field being as strong as practicable, or fully saturated.

The field is wound with a sufficient length and size of wire to take, if necessary, the entire quantity of current generated by the armature to produce the required powerful clutching-effect; and the field coils are wound with such resistances as, when in shunt with the batteries, to take their required amount of current, so that the fields and batteries will each get their proper proportion.

The cells of the battery are, in the running position, arranged in parallel, in shunt with the fields, and this parallel arrangement is preferably the very lowest possible, *i. e.*, with all the cells in parallel, as the slip needed to generate a voltage sufficient to overcome the two and one-half volts E. M. F. of one lead storage cell, will then be reduced to the very smallest amount. In practice, it may be necessary to wind the armature for a higher voltage, say, that of two or three cells in series when lamps requiring a higher voltage are used, so that these lamps can be used while the machine is in operation; but the smallest parallel is much preferred, since the energy consumed in clutching is much less, as the relative difference of speed between the rotors may be less, and fewer revolutions of the engine are required to overcome the resistance of the low voltage cells.

This method of connecting the cells in parallel is of further advantage in that when starting the automobile from rest with the engine still running, there is for a few seconds a larger quantity of current flowing from the electric clutch, and the batteries thus connected can take this excess current without danger of injury.

I have manufactured these clutching generators of the shunt, compound, and series types, but the shunt machine has the great advantage that there is no danger of reversal of the batteries, and no complicated regulating devices are required, which are hard to avoid in series machines. Moreover, in the shunt machine it is not necessary to generate the extra voltage to overcome the resistance of the battery and the resistance of the field in series, as is the case with the compound or series machine, and the two moving parts can run in much closer clutching relation and with much greater efficiency.

It is necessary to use a considerable number of cells in parallel when charging, since their combined voltage when connected in series is necessary to start the engine. As the clutch is wound to generate its clutching voltage at the fewest revolutions practicable, these few revolutions, when the dynamo acts as an engine-starting motor, would not be sufficient properly to start the gas engine; and it is therefore necessary to use the batteries in series, when the dynamo is used as a motor, to develop sufficient power properly to start the engine.

The voltage generated by the electric clutch when acting as a generator is practically constant at any speed of the gas engine or automobile.

By reason of the low resistance of the battery cells, a slight variation of the voltage can cause a considerable variation of current flow through the battery cells and somewhat of a variation in the fields.

Since the fields are shunt wound, and in fixed relation with the armature and battery, and the armature runs in the same direction as a dynamo or motor, it permits the battery to drop in and act as a brake whenever the slip drops below the generating point, acting just as it does when starting the engine.

If while the automobile is running the batteries are thrown in in series, as in the engine starting position, instead of in parallel as in the running position, a greater braking effect is produced, as under these conditions the battery tends to run the car backward and the engine forward, the clutch itself thus acting as an emergency brake.

In the operation of an automobile provided with the dynamo-electric clutch above described, there are thus four forces tending to effect the relative rate of revolution of the rotors, to wit:—

(1) The drag of the load tending to increase the slip:

(2) The magnetic pull tending to decrease the slip:

(3) The frictional pull resulting from centrifugal and spring force, tending also to decrease the slip; and, when a storage battery is used, (4) The power of the battery tending, when the voltage generated by the armature is less than that of the battery, to increase the slip, by trying to drive the two rotors in opposite directions to cause the engine to speed up and the load to slow down, this action being like that which occurs in starting the engine.

I have found that a proper adjustment of the weight of the brushes and moving parts associated therewith, or a proper adjustment of the pressure of the springs, or a combination of both features, enables such a balance between these sets of opposing forces to be obtained that at a predetermined (fixed) rate of speed on an unobstructed roadway or any fixed rate of speed above the predetermined fixed rate of speed of the automobile, any tendency to increase the slip at such higher speeds is compensated and the voltage at the brushes of the armature will be maintained substantially the same as that of the battery and in no event be permitted to rise above such voltage, so that there will be no flow of current into the battery, except during the short time of increasing the speed and thus no danger of overcharging. The battery, though still connected in the system, is thus practically receiving no current.

For example, if the predetermined speed at which the battery shall receive practically no current is twenty miles an hour, the parts are so adjusted that at that speed, the frictional pull assists the magnetic pull between the two rotors to keep the slip at such an amount that the clutching current is generated at a voltage practically the same as that of the battery. If now the speed of the automobile be increased for example from twenty to twenty-five miles per hour, the drag of the machine will momentarily during this increase of speed increase the slip between the rotors, thus causing additional current to be generated to flow into the battery. As soon as the twenty-five mile speed is reached and maintained the increased centrifugal pressure, due to the increased speed, assisting the magnetic pull between the rotors, will again bring the slip to practically the same as that when running twenty miles per hour and practically no current will be flowing through the batteries. When the speed of the automobile is diminished from this higher speed, there is a momentary tendency for the slip to diminish, which would then result in lowering the voltage at the brushes below that of the battery, and in consequence permit a flow of current from the battery; but this tendency is again corrected, because since the dynamo-electric clutch is shunt wound the battery would immediately send current over the armature in a reverse direction and cause an opposing reaction between the rotors tending to again increase the slip and thus maintain the slip at the normal point with the battery still connected but with practically no current flowing through it.

In practice, it has been found that these actions and reactions so completely maintain the clutching action of the two rotors, that the battery is practically receiving no current above the predetermined speed point, except during the short time of increasing the speed, and there is no overcharging of the battery.

It will be further apparent that this centrifugal action may be utilized to assist the magnetic clutching effect between the rotors of the dynamo-electric clutch, even in the absence of the battery from the system.

These results are preferably obtained by utilizing only those parts, such as the brushes and lever arms, already present in the dynamo-electric machine. I may, however, if desired, use a centrifugally-operated sliding clutch, entirely independent of the commutator, in which case any suitable form of commutator other than that shown, may be used. In this modified construction, a friction ring is secured to or formed as a part of one of the rotors and coöperating centrifugally-operated sliding members are arranged to engage the inner surface of this friction ring.

Figure 10:
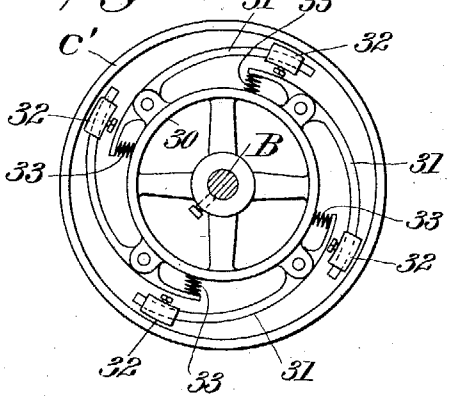
Fig. 10 is an elevation of Fig. 9.
Figure 9:
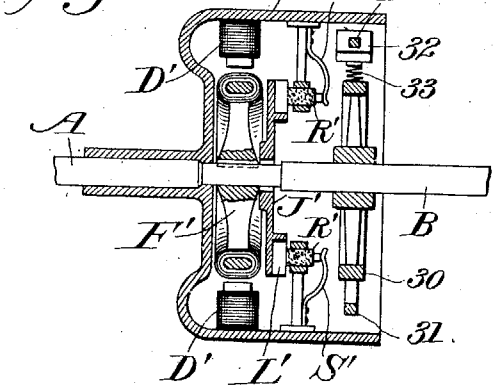
Fig. 9 is a vertical section through a modified form of dynamo-electric clutch having a separate centrifugally-operated sliding clutch.

Such a construction is shown in Figs. 9 and 10 of the drawings, in which the dynamo-electric clutch is, for convenience of illustration, schematically shown. Referring to these Figs. 9 and 10, A is the engine shaft to which is secured the casing C′, carrying the field magnets D′. The armature F′ is secured to the driven shaft B. J′ is the commutator, secured to the armature and having the commutator bars L′, on which bear the brushes R′, R′, carried by brush-holders secured to the drum C′. S′ are springs for holding the brushes against the commutator. No circuit connections are shown, as these will be readily understood from the previous more detailed description of the dynamo-electric clutch.

As shown in Fig. 9, the casing C′ is laterally extended, and, arranged to bear against the inner surface of the extended portion, are a series of weighted pressure blocks 32, adjustably and removably secured to arms 31, which are pivoted to the ring 30, secured to the shaft B. Springs 33 located between the heels of the arms 31 and the ring 30 normally prevent engagement of the blocks 32 with the casing, or the arms may be made of spring metal and arranged to normally hold the blocks away from the casing, while permitting them to engage upon the development of sufficient centrifugal force. When the shaft rotates at sufficient speed, the weights are thrown outwardly by centrifugal force and rub with a sliding friction against the inner surface of the casing.

By using pressure blocks of proper weight, or adjusting the positions of the weights on the arms, the amount of friction developed by the rubbing of the pressure blocks against the inner surface of the casing can be regulated to the desired degree.

Obviously, this system is also applicable when a storage battery is used, the operation then being the same as that above described when the brushes and their co-operating parts are used to form the sliding member of the clutch.

It is further apparent that if, while the automobile is running above the predetermined rate of speed, as for example down-hill, the controller 91 be operated to break the electrical connections, there will be no magnetic pull between the rotors, which will then be mechanically connected only by the frictional engagement of the centrifugally-acting devices. The engine, if the gas be cut off, is now, instead of driving the machine, being driven, against its compression, by the momentum of the machine, and thus automatically acts as a brake.

A further advantage of my invention is that it permits the charging of the batteries without the aid of the usual regulating devices.

Moreover, the flexibility of the clutch, as compared with the rigidity of a mechanical clutch, diminishes the cost of operation in that the engine operates without jar or strain, especially in starting or changing speed, and at the same time and for a like reason, the wear of the tires is diminished.

My invention permits the utilization of the whole power of the gas-engine through its whole range of speeds, in driving the load shaft, through gears or otherwise, except for the loss of the small fraction of the whole power lost in the clutch.

While I have shown the rotating field magnet connected to the gas-engine shaft, and the rotating armature to the driven shaft, this arrangement may be reversed.

I claim:—

1. In combination, a variable speed prime mover, a driving shaft connected thereto, a driven load-shaft and a dynamo-electric generating clutch whereof the rotatable field and rotatable armature are connected one to said driving shaft and one to said driven shaft, said clutch constructed and arranged to generate an amount of current sufficient to effect a clutching action between said shafts, the balance of engine power being transmitted through said clutch to said driven shaft, one of the said rotors having movably connected thereto parts adapted to be actuated by centrifugal force, and the other rotor having a member with which said parts are adapted slidingly to engage, said parts being so proportioned that the centrifugally produced friction between said parts and member when in engagement assists the magnetic clutching action and helps compensate any tendency to increased slip at high speed.

2. In combination, a variable speed prime mover, a driving shaft connected thereto, a driven load shaft and a dynamo-electric generating clutch whereof the rotatable field and rotatable armature are connected one to said driving shaft and one to said driven shaft, said clutch constructed and arranged to generate an amount of current sufficient to effect a clutching action between said shafts, the balance of engine power being transmitted through said clutch to said driven shaft, one of said rotors having movably connected thereto parts adapted to be actuated by centrifugal force, and the other rotor having a member with which said parts are adapted slidingly to engage, said parts being so proportioned that the centrifugally produced friction between said parts and member when in engagement assists the magnetic clutching action and helps compensate any tendency to increased slip at high speed, and adjustable means for regulating the friction between said parts and member.

3. In combination, a variable speed prime mover, a driving shaft connected thereto, a driven load-shaft and a dynamo-electric generating clutch whereof the rotatable field and rotatable armature are connected one to said driving shaft and one to said driven shaft, said clutch constructed and arranged to generate an amount of current sufficient to effect a clutching action between said shafts, the balance of engine power being transmitted through said clutch to said driven shaft, a commutator carried by one of said rotors, current collecting devices adapted to be actuated by centrifugal force, movably mounted on the other rotor and engaging said commutator, the current collecting devices being so adjusted that the centrifugally produced pressure between the current collecting devices and the commutator will assist to the desired extent the magnetic clutching action.

4. In combination, a variable speed prime mover, a driving shaft connected thereto, a driven load-shaft and a dynamo-electric generating clutch whereof the rotatable field and rotatable armature are connected one to said driving shaft and one to said driven shaft, said clutch constructed and arranged to generate an amount of current sufficient to effect a clutching action between said shafts, the balance of engine power being transmitted through said clutch to said driven shaft, a commutator carried by one of said rotors, current collecting devices adapted to be actuated by centrifugal force, movably mounted on the other rotor and engaging said commutator, the current collecting devices being so proportioned that the centrifugally produced pressure between the current collecting devices and the commutator will assist to the desired extent the magnetic clutching action.

5. In combination, a variable speed prime mover, a driving shaft connected thereto, a driven load-shaft and a dynamo-electric generating clutch whereof the rotatable field and rotatable armature are connected one to said driving shaft and one to said driven shaft, said clutch constructed and arranged to generate an amount of current sufficient to effect a clutching action between said shafts, the balance of engine power being transmitted through said clutch to said driven shaft, a commutator carried by one of said rotors, current collecting devices adapted to be actuated by centrifugal force, movably mounted on the other rotor and engaging said commutator, the current collecting devices being so adjusted that the centrifugally produced pressure between the current collecting devices and the commutator will assist to the desired extent the magnetic clutching action, and adjustable means for regulating the friction between said commutator and current collecting devices.

6. In combination, a variable speed prime mover, a driving shaft connected thereto, a driven load-shaft and a dynamo-electric generating clutch whereof the rotatable field and rotatable armature are connected one to said driving shaft and one to said driven shaft, said clutch constructed and arranged to generate an amount of current sufficient to effect a clutching action between said shafts, the balance of engine power being transmitted through said clutch to said driven shaft, a commutator carried by one of said rotors, current collecting devices, adapted to be actuated by centrifugal force, movably mounted on the other rotor and engaging said commutator, springs for holding said current collecting devices against the commutator, and means for adjusting the compression of the springs, the current collecting devices and spring pressure being so adjusted that the combined effect of the spring pressure and the centrifugally produced pressure will assist to the desired extent the magnetic clutching action.

7. In combination, a variable speed prime mover, a driving shaft connected thereto, a driven load-shaft and a dynamo-electric generating clutch whereof the rotatable field and rotatable armature are connected one to said driving shaft and one to said driven shaft, a storage battery having its respective poles connected to like poles of the armature, said clutch constructed and arranged to generate an amount of current sufficient to effect a clutching action between said shafts, the balance of engine power being transmitted through said clutch to said driven shaft, one of said rotors having movably connected thereto parts adapted to be actuated by centrifugal force, and the other rotor having a member with which said parts are adapted slidingly to engage, said parts being so proportioned that the centrifugally produced friction between said parts and member when in engagement assists the magnetic clutching action and helps compensate any tendency to increased slip at high speed.

8. In combination, a variable speed prime mover, a driving shaft connected thereto, a driven load-shaft and a dynamo-electric generating clutch whereof the rotatable field and rotatable armature are connected one to said driving shaft and one to said driven shaft, a storage battery having its respective poles connected to like poles of the armature, said clutch constructed and arranged to generate an amount of current sufficient to effect a clutching action between said shafts, the balance of engine power being transmitted through said clutch to said driven shaft, one of said rotors having movably connected thereto parts adapted to be actuated by centrifugal force, and the other rotor having a member with which said parts are adapted slidingly to engage, said parts being so proportioned that the centrifugally produced friction between said parts and member when in engagement assists the magnetic clutching action and helps compensate any tendency to increased slip at high speed, and adjustable means for regulating the friction between said parts and member.

9. In combination, a variable speed prime mover, a driving shaft connected thereto, a driven load-shaft and a dynamo-electric generating clutch whereof the rotatable field and rotatable armature are connected one to said driving shaft and one to said driven shaft, a storage battery having its respective poles connected to like poles of the armature, said clutch constructed and arranged to generate an amount of current sufficient to effect a clutching action between said shafts, and to charge the storage battery, the balance of engine power being transmitted through said clutch to said driven shaft, one of said rotors, having movably connected thereto parts adapted to be actuated by centrifugal force, and the other rotor having a member with which said parts are adapted slidingly to engage, said parts being so proportioned that the centrifugally produced friction between said parts and member when in engagement assists the magnetic clutching action and helps compensate any tendency to increased slip at high speed.

10. In combination, a variable speed prime mover, a driving shaft connected thereto, a driven load-shaft and a dynamo-electric generating clutch whereof the rotatable field and rotatable armature are connected one to said driving shaft and one to said driven shaft, a storage battery having its respective poles connected to like poles of the armature, said clutch constructed and arranged to generate an amount of current sufficient to effect a clutching action between said shafts, and to charge the storage battery, the balance of engine power being transmitted through said clutch to said driven shaft, one of said rotors having movably connected thereto parts adapted to be actuated by centrifugal force, and the other rotor having a member with which said parts are adapted slidingly to engage, said parts being so proportioned that the centrifugally produced friction between said parts and member when in engagement assists the magnetic clutching action and helps compensate any tendency to increased slip at high speed, and adjustable means for regulating the friction between said parts and member.

11. In combination, a variable speed prime mover, a driving shaft connected thereto, a driven load-shaft and a dynamo-electric generating clutch whereof the rotatable field and rotatable armature are connected one to said driving shaft and one to said driven shaft, a storage battery having its respective poles connected to like poles of the armature, said clutch constructed and arranged to generate an amount of current sufficient to effect a clutching action between said shafts, the balance of engine power being transmitted through said clutch to said driven shaft, a commutator carried by one of said rotors, current collecting devices adapted to be actuated by centrifugal force, movably mounted on the other rotor and engaging said commutator, the current collecting devices being so adjusted that the centrifugally produced pressure between the current collecting devices and the commutator will assist to the desired extent the magnetic clutching action.

12. In combination, a variable speed prime mover, a driving shaft connected thereto, a driven load-shaft and a dynamo-electric generating clutch whereof the rotatable field and rotatable armature are connected one to said driving shaft and one to said driven shaft, a storage battery having its respective poles connected to like poles of the armature, said clutch constructed and arranged to generate an amount of current sufficient to effect a clutching action between said shafts, and to charge the storage battery, the balance of engine power being transmitted through said clutch to said driven shaft, a commutator carried by one of said rotors, current collecting devices adapted to be actuated by centrifugal force, movably mounted on the other rotor and engaging said commutator, the current collecting devices being so adjusted that the centrifugally produced pressure between the current collecting devices and the commutator will assist to the desired extent the magnetic clutching action.

13. In combination, a variable speed prime mover, a driving shaft connected thereto, a driven load-shaft and a dynamo-electric generating clutch whereof the rotatable field and rotatable armature are connected one to said driving shaft and one to said driven shaft, a storage battery having its respective poles connected to like poles of the armature, said clutch constructed and arranged to generate an amount of current sufficient to effect a clutching action between said shafts, the balance of engine power being transmitted through said clutch to said driven shaft, a commutator carried by one of said rotors, current collecting devices adapted to be actuated by centrifugal force movably mounted on the other rotor and engaging said commutator, the current collecting devices being so adjusted that the centrifugally produced pressure between the current collecting devices and the commutator will assist to the desired extent the magnetic clutching action, and adjustable means for regulating the friction between, said commutator and current collecting devices.

14. In combination, a variable speed prime mover, a driving shaft connected thereto, a driven load-shaft and a dynamo-electric generating clutch whereof the rotatable field and rotatable armature are connected one to said driving shaft and one to said driven shaft, a storage battery having its respective poles connected to like poles of the armature, said clutch constructed and arranged to generate an amount of current sufficient to effect a clutching action between the shafts, and to charge the storage battery, the balance of engine power being transmitted through said clutch to said driven shaft, a commutator carried by one of said rotors, current collecting devices adapted to be actuated by centrifugal force movably mounted on the other rotor and engaging said commutator, the current collecting devices being so adjusted that the centrifugally produced pressure between the current collecting devices and the commutator will assist to the desired extent the magnetic clutching action, and adjustable means for regulating the friction between said commutator and current collecting devices.

15. In combination, a variable speed prime mover, a driving shaft connected thereto, a driven load-shaft and a dynamo-electric generating clutch whereof the rotatable field and rotatable armature are connected one to said driving shaft and one to said driven shaft, a storage battery having its respective poles connected to like poles of the armature, said clutch constructed and arranged to generate an amount of current sufficient to effect a clutching action between said shafts, the balance of engine power being transmitted through said clutch to said driven shaft, a commutator carried by one of said rotors, current collecting devices, adapted to be actuated by centrifugal force, movably mounted on the other rotor and engaging said commutator, springs for holding said current collecting devices against the commutator and means for adjusting the compression of the springs, the current collecting devices and spring pressure being so adjusted that the combined effect of the spring pressure and the centrifugally produced pressure will assist to the desired extent the magnetic clutching action.

16. An automobile, having a variable speed gas engine and means for controlling admission of gas thereto, a driving shaft connected to the engine, a driven load shaft and a dynamo-electric clutch whereof the rotatable field and rotatable armature are connected one to said driving shaft and one to said driven shaft, and a controller for making and breaking the dynamo circuits, one of the rotors having movably connected thereto parts adapted to be actuated by centrifugal force and the other rotor having a member with which such parts are adapted slidingly to engage, said parts being so proportioned that at a predetermined speed of rotation the parts and member will be brought into frictional engagement, whereby when the gas is cut off and the dynamo circuits broken, the engine may act as a braking-device.

17. In combination, a variable speed prime mover, a driving shaft connected thereto, a driven shaft, an electro-magnetic clutch having one element connected to said driving shaft and the other element to said driven shaft and having centrifugally operated means for coupling said shafts.

18. In combination, a variable speed prime mover, a driving shaft, a driven shaft and power transmitting means between said shafts comprising clutching mechanism having an automatically decreasing electromagnetic clutching effect as the relative speed of the shafts decreases and increasing centrifugal clutching effect as the speed of said driven shaft increases.

19. In combination, a variable speed prime mover, a driving shaft connected thereto, a driven shaft, and clutch mechanism between said shafts having an electromagnetic clutching action and also a mechanical clutching action dependent upon the speed of the driven shaft.

20. In combination, a variable speed prime mover, a driving shaft connected thereto, a driven shaft, and automatic clutch mechanism between said shafts having an electromagnetic clutching action and a mechanical clutching action which automatically increases with the speed of the driven shaft.

21. In combination, a variable speed prime mover, a driving shaft connected thereto, a driven shaft, and clutch mechanism for coupling said shafts comprising electromagnetic and centrifugally operated mechanical means.

22. In combination, a variable speed prime mover, a driving shaft connected thereto, a driven shaft, and clutching mechanism for clutching said shafts comprising electromagnetic means, said means including current carrying devices having parts weighted for securing increasing mechanical clutching action with increase of speed.

23. In combination, a variable speed prime mover, a driving shaft connected thereto, a driven shaft, and clutching mechanism for coupling said shafts having an electromagnetic action decreasing with decrease of relative speeds of said shafts and having an internal friction surface on one of said shafts and weighted parts on the other of said shafts adapted to engage said surface with increasing frictional clutching effect with increase in speed of said last named shaft.

24. In combination, a variable speed prime mover, a driving shaft connected thereto, a driven shaft, an electromagnetic clutch having one element connected to said driving shaft and the other element to said driven shaft and having centrifugally operated means for coupling said shafts, and a storage battery in circuit with said clutch.

25. In combination, a variable speed prime mover, a driving shaft connected thereto, a driven shaft, clutch mechanism for coupling said shafts comprising electromagnetic and centrifugally operated mechanical means, and a storage battery in circuit with the electromagnetic means.

26. In combination, a variable speed prime mover, a driving shaft connected thereto, a driven shaft, clutching mechanism for clutching said shafts comprising electromagnetic means, said means including currrent carrying devices having parts weighted for securing increasing mechanical clutching action with increase of speed, and a storage battery in circuit with the electromagnetic means.

WILLIAM MORRISON.